(12) United States Patent
Bess et al.

(10) Patent No.: US 11,485,112 B2
(45) Date of Patent: *Nov. 1, 2022

(54) BUILDING MEMBRANE WITH POROUS PRESSURE SENSITIVE ADHESIVE

(71) Applicant: VAPROSHIELD, LLC, Gig Harbor, WA (US)

(72) Inventors: Daniel Bess, Geneva, OH (US); Robert Piecenski, Montville, OH (US)

(73) Assignee: VaproShield, LLC

( * ) Notice: Subject to any disclaimer, the term of this patent is extended or adjusted under 35 U.S.C. 154(b) by 0 days.

This patent is subject to a terminal disclaimer.

(21) Appl. No.: 14/121,027

(22) Filed: Jul. 22, 2014

(65) Prior Publication Data

US 2015/0024159 A1    Jan. 22, 2015

Related U.S. Application Data

(60) Provisional application No. 61/958,161, filed on Jul. 22, 2013.

(51) Int. Cl.
*B32B 5/26* (2006.01)
*E04B 1/62* (2006.01)
(Continued)

(52) U.S. Cl.
CPC .................. *B32B 5/26* (2013.01); *B32B 5/00* (2013.01); *B32B 5/022* (2013.01); *B32B 7/04* (2013.01);
(Continued)

(58) Field of Classification Search
CPC ......... B32B 27/36; C09J 7/021; C08K 3/0058
See application file for complete search history.

(56) References Cited

U.S. PATENT DOCUMENTS 2,140,026 A * 12/1938 Edward .................. B29C 67/24
264/50
3,440,185 A *  4/1969 Hanley ..................... C08J 9/28
264/126
(Continued)

FOREIGN PATENT DOCUMENTS

EP      0 397 554 B1    8/1994
EP      0874099 A2      2/2001
(Continued)

OTHER PUBLICATIONS

Derwent Abstract of JP 2001-3025, see above for date and inventor.*

(Continued)

*Primary Examiner* — Chinessa T. Golden
(74) *Attorney, Agent, or Firm* — Janeway Patent Law PLLC; John Janeway

(57) ABSTRACT

A breathable multilayer spun bonded polypropylene membrane having a coated pressure sensitive adhesive capable of allowing air and moisture vapor to pass through it. The adhesive is formed of a copolymer comprising a backbone of n-butyl acrylate, 2-ethylhexyl acrylate, and vinyl acetate which is mixed with a surfactant and emulsified to produce bubbles which form pores when the copolymer is set with about 80% to about 90% of the pore sizes ranging from about 200 microns to about 300 microns and a pore density in the cured pressure sensitive adhesive ranging from about 4200 per inch$^2$ to about 4600 per inch$^2$, said pores being uniformly distributed to form a flow path through the adhesive.

11 Claims, 3 Drawing Sheets

(51) Int. Cl.

| | | |
|---|---|---|
| *B32B 37/12* | (2006.01) | |
| *B32B 5/02* | (2006.01) | |
| *B32B 27/00* | (2006.01) | |
| *B32B 27/06* | (2006.01) | |
| *B32B 5/00* | (2006.01) | |
| *B32B 7/12* | (2006.01) | |
| *B32B 27/36* | (2006.01) | |
| *B32B 7/04* | (2019.01) | |
| *B32B 27/32* | (2006.01) | |
| *B32B 27/18* | (2006.01) | |
| *E04D 12/00* | (2006.01) | |
| *C09J 7/21* | (2018.01) | |
| *C09J 7/38* | (2018.01) | |
| *C09J 7/25* | (2018.01) | |
| *C09J 133/08* | (2006.01) | |
| *E04D 5/10* | (2006.01) | |
| *B32B 37/24* | (2006.01) | |

(52) U.S. Cl.
CPC ............... *B32B 7/12* (2013.01); *B32B 27/00* (2013.01); *B32B 27/06* (2013.01); *B32B 27/18* (2013.01); *B32B 27/32* (2013.01); *B32B 27/36* (2013.01); *B32B 37/12* (2013.01); *C09J 7/21* (2018.01); *C09J 7/255* (2018.01); *C09J 7/38* (2018.01); *C09J 133/08* (2013.01); *E04B 1/625* (2013.01); *E04D 5/10* (2013.01); *E04D 12/002* (2013.01); *B32B 37/1284* (2013.01); *B32B 2037/1253* (2013.01); *B32B 2037/243* (2013.01); *B32B 2255/00* (2013.01); *B32B 2255/02* (2013.01); *B32B 2255/10* (2013.01); *B32B 2255/26* (2013.01); *B32B 2262/00* (2013.01); *B32B 2262/0253* (2013.01); *B32B 2305/026* (2013.01); *B32B 2307/3065* (2013.01); *B32B 2307/724* (2013.01); *B32B 2309/02* (2013.01); *B32B 2419/00* (2013.01); *B32B 2419/06* (2013.01); *C09J 2423/10* (2013.01); *C09J 2433/00* (2013.01); *C09J 2467/006* (2013.01); *Y10T 156/10* (2015.01); *Y10T 428/1452* (2015.01); *Y10T 428/249979* (2015.04); *Y10T 442/651* (2015.04)

(56) References Cited

U.S. PATENT DOCUMENTS

| | | | |
|---|---|---|---|
| 3,445,272 A * | 5/1969 | Newton, Jr. | B05D 7/24 442/76 |
| 3,539,388 A * | 11/1970 | Shu-Tung | B29C 67/202 264/331.19 |
| 3,979,867 A | 9/1976 | Sowinski | |
| 4,098,044 A | 7/1978 | Slavik | |
| 4,163,822 A | 8/1979 | Walter | |
| 4,252,590 A | 2/1981 | Rasen et al. | |
| 4,315,392 A | 2/1982 | Sylvest | |
| 4,655,210 A * | 4/1987 | Edenbaum | A61F 13/0203 602/46 |
| 4,764,412 A | 8/1988 | Burns | |
| 4,815,963 A | 3/1989 | Berkhout | |
| 4,851,272 A | 7/1989 | Knox, III | |
| 5,099,627 A | 3/1992 | Coulton et al. | |
| 5,425,672 A | 6/1995 | Rotter | |
| 5,598,673 A | 2/1997 | Atkins | |
| 5,617,687 A | 4/1997 | Bussey, Jr. | |
| 5,709,651 A | 1/1998 | Ward | |
| 5,960,595 A | 10/1999 | McCorsley, III et al. | |
| 5,973,015 A | 10/1999 | Coronado et al. | |
| 5,993,927 A | 11/1999 | Sugita et al. | |
| 6,131,353 A | 10/2000 | Egan | |
| 6,284,368 B2 * | 9/2001 | Muta | 428/345 |
| 6,316,016 B1 | 11/2001 | Iwakawa | |
| 6,594,965 B2 | 7/2003 | Coulton | |
| 6,804,922 B1 | 10/2004 | Egan | |
| 6,927,267 B1 * | 8/2005 | Varela de la Rosa | C08F 220/12 526/287 |
| 6,938,383 B2 | 9/2005 | Morris et al. | |
| 7,117,649 B2 | 10/2006 | Morris et al. | |
| RE39,825 E | 9/2007 | Morris et al. | |
| 7,488,523 B1 | 2/2009 | Muncaster | |
| 7,617,638 B1 | 11/2009 | Slama et al. | |
| 7,651,757 B2 | 1/2010 | Jones et al. | |
| 8,146,310 B2 | 4/2012 | Keene | |
| 8,245,472 B2 | 8/2012 | Keene | |
| 8,387,336 B2 | 3/2013 | Coulton | |
| 2002/0146953 A1 | 10/2002 | Lubker, II | |
| 2003/0232171 A1 | 12/2003 | Keith | |
| 2004/0106346 A1 | 6/2004 | Zafiroglu | |
| 2004/0180195 A1 | 9/2004 | Macuga | |
| 2004/0237464 A1 | 12/2004 | Khan | |
| 2005/0000172 A1 | 1/2005 | Anderson | |
| 2005/0014431 A1 | 1/2005 | Carmody et al. | |
| 2005/0055983 A1 | 3/2005 | Tomes | |
| 2005/0214496 A1 | 9/2005 | Borenstein | |
| 2006/0096218 A1 | 5/2006 | Johnson | |
| 2006/0101758 A1 | 5/2006 | Egan | |
| 2006/0211781 A1 | 9/2006 | Strandburg | |
| 2007/0212520 A1 | 9/2007 | Furumori et al. | |
| 2008/0120935 A1 | 5/2008 | Lembo | |
| 2008/0268224 A1 | 10/2008 | Kim | |
| 2009/0047465 A1 | 2/2009 | Zafiroglu | |
| 2009/0288358 A1 | 11/2009 | Snyder | |
| 2011/0185666 A1 | 8/2011 | Russell | |
| 2013/0052401 A1 | 2/2013 | Snyder | |

FOREIGN PATENT DOCUMENTS

| | | | |
|---|---|---|---|
| FI | 116226 B | | 10/2005 |
| GB | 2473618 A | | 3/2011 |
| JP | 07048554 A | * | 2/1995 |
| JP | 2001003025 A | * | 1/2001 |
| MX | PA03001867 A | | 6/2003 |
| WO | 2006047130 A1 | | 11/2006 |
| WO | 2008067611 A1 | | 6/2008 |
| WO | WO 2009/127819 A1 | | 10/2009 |
| WO | 2010056372 A1 | | 5/2010 |

OTHER PUBLICATIONS

Cosella-Dorken Products, Inc. Technical Data Sheet for DELTA®-Fassade S and DELTA®-Fassade S Plus UV, Dec. 21, 2011.

Cosella-Dorken Products, Inc. Technical Data Sheet for DELTA®-Vent S.

Irish Agreement Board, "DuPont TYVEK® Supro Vapour Permeable Roofing Underlays for Pitched Roofs", Certificate No. 04/0157, Nov. 2004.

British Board of Agreement, TYVEK® SUPRO Roof Tile Underlayment for Use in Warm Non-Ventilated and Cold Ventilated Roofs, Certificate No. 08/4548, Apr. 8, 2008.

\* cited by examiner

BUILDING MEMBRANE WITH POROUS PRESSURE SENSITIVE ADHESIVE

CROSS-REFERENCE TO RELATED APPLICATIONS

This is a utility patent application claiming priority and the benefits of U.S. Provisional Patent Application No. 61/958,161, filed Jul. 22, 2013.

TECHNICAL FIELD OF THE INVENTION

The present invention relates generally to air permeable and water vapor permeable building sheets which are fastened to the building by pressure sensitive adhesive which is coated on a surface of the building sheet.

BACKGROUND OF THE INVENTION

Architects and engineers agree that buildings must be able to breathe; however most commonly used building underlayments and membranes trap condensation and moisture in wall cavities which can lead to poor indoor air quality, energy deficiencies and costly building damage. The North American building industry spends around $9 billion dollars each year repairing and litigating building damages from water and moisture. New materials used in building construction over the last 20 years are energy efficient, but ventilation poor, resulting in toxic mold claims of over $3 billion dollars. Air leakage from such membranes can result in increased energy use of up to 30-40% in heating climates and 10-15% in cooling climates.

Proper building envelope design promotes continual drying by allowing vapor to escape. Moisture can penetrate a building envelope through materials and rain/snow exposure during construction. General occupancy also adds to the moisture levels. Trapped moisture can cause wood rot, swelling and distortion of lumber, corrosion of metal and reduction of insulation thermal value. Any or all of these issues result in a high risk of mold, mildew, building deterioration, poor indoor air quality and health and safety risks to the occupant. In some states, new air tightness and energy saving requirements increase the possibility of trapped moisture, when low or non-permeable air barriers are utilized.

Current building construction uses barrier sheets or membranes to form an envelope around the construction to allow the transport of moisture into and out of a building and to control the movement of air through a wall or roof covered by the barrier sheet. Common commercial barrier sheets or membranes are sold under the TYVEK® Commercial, TYPAR®, and DOW WEATHERMATE PLUS® brands. These and other commercial barrier sheets commonly use adhesive which is applied to the sheet so that the same can be secured to a wall or roof. Problems which occur in these commercial usages is that the adhesive used is not pressure sensitive or that it may not be porous to allow water vapor transmission.

It is well known to provide a planar carrier membrane with an adhesive application which is limited on the surface area or interrupted by adhesive free places. It is also well known to perforate the adhesive composition after placement on the planar carrier membrane with mechanical means or with the aid of air nozzles so that the entire surface of the planar carrier is perforated.

Medical dressings or sheets have used a porous adhesive coated over a substrate surface to allow air flow to reach the wound and allow moisture to be transmitted away from the wound. Examples of such dressings having pores formed in the pressure sensitive adhesive are described in U.S. Pat. No. 4,163,822 issued Aug. 7, 1979 and U.S. Pat. No. 5,709,651 issued Jan. 20, 1998. A porous adhesive for corrugated cardboard is disclosed in U.S. Patent Application Publication Number 2008/0268224 published Oct. 30, 2008. These sheets perform in the same manner as construction barrier sheets, albeit in a smaller surface application area with different substrates. A large surface construction barrier sheet using a vapor permeable adhesive is described in U.S. Patent Application Publication Number 2011/0018566 published on Aug. 4, 2011. The corresponding United States equivalent is U.S. patent application Ser. No. 12/937,823 filed Apr. 15, 2011.

Many construction barrier sheets currently in use are formulated to be weather resistant keeping out water and resisting wind pressure. These sheets are secured to studs and form an "envelope" underneath exterior cladding or roofing. Some commercial barrier sheets are both water vapor permeable and air permeable but have limited pressure sensitive adhesive applied to specific areas of their inner surface. Thus, there exists a need for a highly water vapor permeable and air permeable adhesive which can be applied to the entire inner surface of the barrier sheet allowing it to be easily mounted to studs or the like. The present membrane has uniform vapor permeable characteristics over the surface of the barrier sheet with pores in the adhesive uniformly distributed to form a flow path through the adhesive.

SUMMARY OF THE INVENTION

A breathable multilayer spun bonded polypropylene membrane having a coated pressure sensitive adhesive capable of allowing air and moisture vapor to pass through it. The adhesive is formed of a copolymer comprising a backbone of n-butyl acrylate, 2-ethylhexyl acrylate, and vinyl acetate which is mixed with a surfactant and emulsified in a foam mixer to produce a precisely homogenized mix of adhesive and air bubbles which form pores when the copolymer is set. About 80% to about 90% of the pore sizes in the foamed adhesive range from about 200 microns to about 300 microns and the cured pressure sensitive adhesive has a pore density ranging from about 4200 per inch$^2$ to about 4600 per inch$^2$, with the pores being uniformly distributed and forming a flow path through the adhesive.

It is an object of the present invention to provide a membrane with a pressure sensitive adhesive which is porous with the pores being interconnected allowing vapor transmission through the adhesive.

It is another object of the invention to provide a membrane with a pressure sensitive adhesive covering the entire inner surface of the membrane which allows air and water vapor to be circulated through the adhesive.

It is yet another object of the invention to provide a pressure sensitive porous adhesive which has fire retardant capabilities.

These and other objects, advantages, and novel features of the present invention will become apparent when considered with the teachings contained in the detailed disclosure along with the accompanying drawings.

DETAILED DESCRIPTION OF THE INVENTION

The preferred embodiment and best mode of the invention is shown in FIGS. 1-4.

Figure 1:
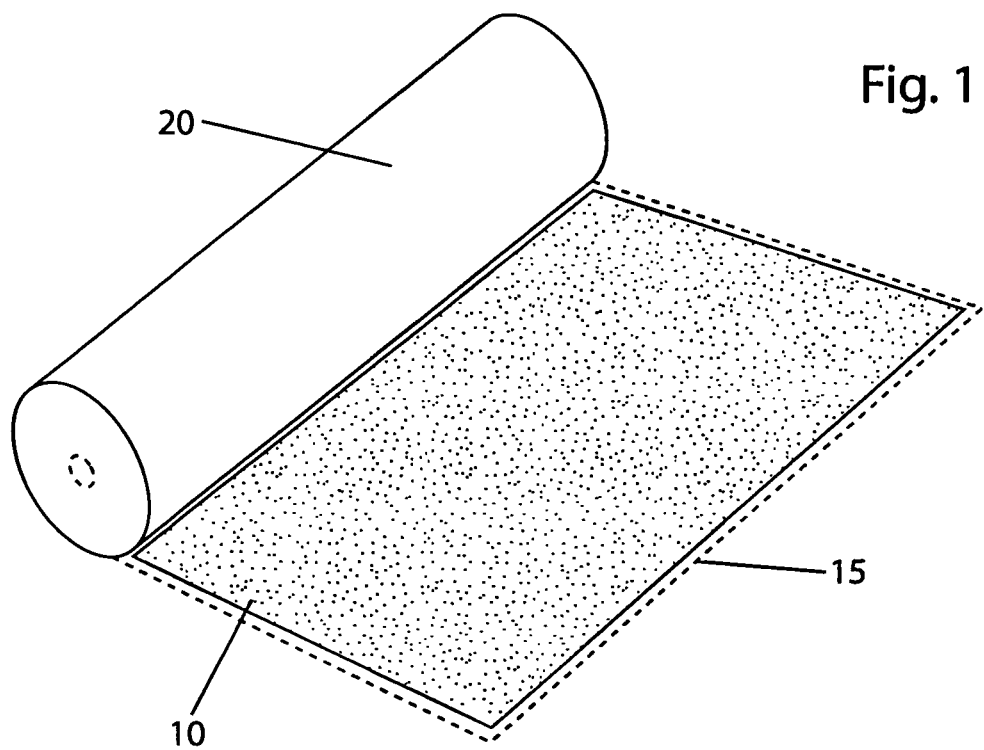
FIG. 1 is a perspective view of a roll of the inventive construction membrane.
Figure 2:
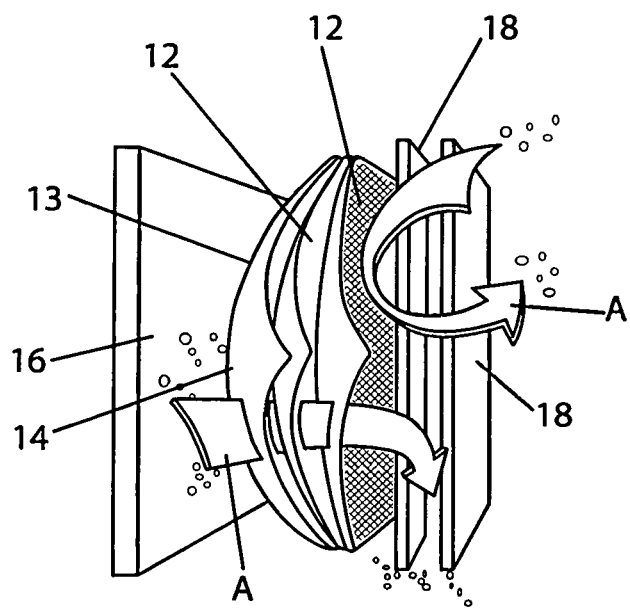
FIG. 2 is an enlarged cross sectional view of the construction membrane shown in FIG. 1.
Figure 3:
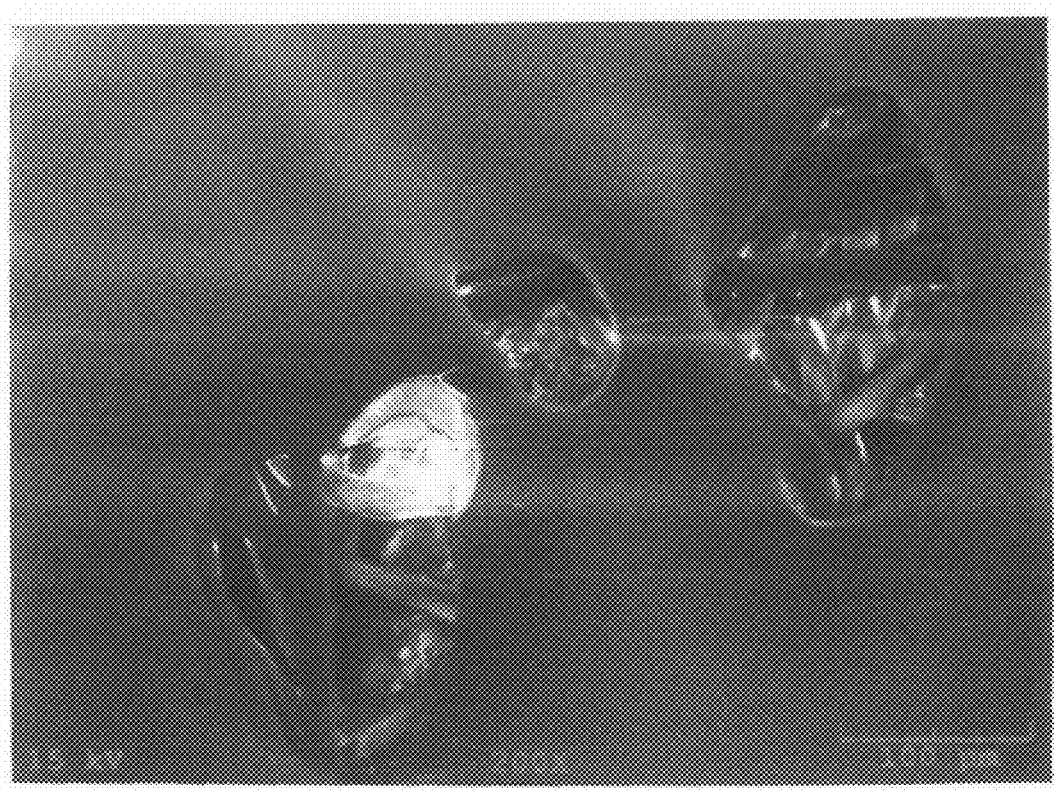
FIG. 3 is a scanning electron microscopy photograph of the porous adhesive used with the construction membrane at 50× magnification.

A building construction envelope or laminate membrane 10 is constructed of multilayer sheets 12 of spun bonded porous polypropylene secured to a liner 13 having a layer of porous pressure sensitive adhesive 14 coated over the entire surface. The adhesive surface is covered by a removable film cover 15. When the film cover is removed, the membrane is mounted to a wall board 16 or roofing material. Cladding 18 in the form of one or more sheets of material is fastened over the outer surface of membrane 10 as shown in FIG. 2. Air and vapor flow is shown by Arrows A.

Each sheet 12 is constructed of non-woven polypropylene fibers and the sheets are secured together to form a laminate. The membrane 10 is produced as a roll of sheet material 20, preferably 164 feet in length and with a width of 58-60 inches. The membrane 10 is water resistant with air permeability and has a water vapor transmission greater than 20 Perms, preferably ranging from 50 to 70 Perms. The produced membranes are inert and can be recycled into their original bed form for reuse.

The pressure sensitive porous adhesive 14 is coated onto the bottom layer or liner 13 of spun bonded polypropylene liner sheet which is secured as is well known in the art to another sheet or sheets of spun bonded polypropylene 12 to form a laminate membrane 10. The composite structure of the present invention has a high vapor permeability (50-70 Perms) and the adhesive breathes allowing vapor to escape and air to circulate while being water resistant.

A Perm is a unit of water vapor transmission defined as 1 grain of water vapor per square foot per hour per inch of mercury pressure difference (1 inch mercury=0.49 psi). The metric unit of measure is ng/m2 s Pa. 1 perm=55 ng/m2 s Pa. Permeability is the time rate of water vapor transmission through unit area of a material of unit thickness induced by unit vapor pressure difference between two specific surfaces, under specified temperature and humidity conditions. Membranes with a higher Perm value greater than 20 reduce the risk of condensation and promote escape of moisture through the building envelope. Additionally, membranes with a high Penn value can help building materials dry-out during the construction phase.

The copolymer portion of the pressure sensitive adhesive (PSA) has a backbone consisting of n-butyl acrylate, 2-ethylhexyl acrylate, and vinyl acetate. The n-butyl acrylate compound has a $CH_2$ (A) linked to a CH (B) with a linked chain of carbon U and linked oxygen with a chain of $CH_2$ (C), $CH_2$ (D), $CH_2$ (E) and $CH_3$ (F). The polymer 2-ethylhexyl acrylate has $CH_2$ (G) linked to CH (H) with a linked chain of carbon V and linked oxygen with a chain of $CH_2$ (I), CH (J), $CH_2$ (K), $CH_3$ (L) and a chain of $CH_2$ (M'), $CH_2$ (N), $CH_2$ (O) and $CH_3$ (P). The polymer vinyl acetate has a $CH_2$ (Q) link to CH (R) which is in turn linked to an oxygen linked to a carbon (W) linked to an oxygen and $CH_3$ (S). The structure of the backbone is shown in Table I below as follows:

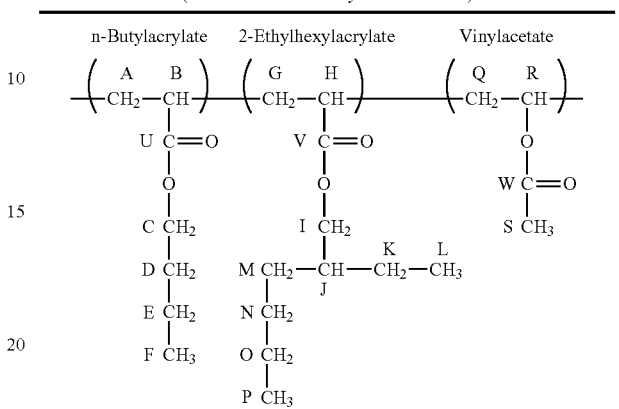

TABLE I (Structure of PSA Polymer Backbone)

The adhesive fully bonds to almost any substitute for air tightness and ease of installation and requires no primer.

The pressure sensitive adhesive (PSA) is an acrylic solution. The polymeric portion of the PSA makes up at least 95% of the adhesive formulation and has a copolymer backbone of n-butyl acrylate (about 60% by weight), 2-ethylhexyl acrylate (about 32% by weight) and vinyl acetate (about 7% by weight) forming a copolymer solvent blend capable of accepting water. Proper foaming of the adhesive is critical to good micropore formation. The aeration process includes high sheer mixing to entrain air in the mixed liquid solution. Once the proper foam level is produced, the adhesive needs to be coated on the liner and the micropores formed. The coating method used with the present invention was a blade coater. This is a non-contact coating method and it does not crush or destroy the foam during coating. It should be noted that other coating methods such as Meyer rod, comma coating and pattern bar coating were attempted but found to be detrimental to suitable micropore formation. After coating, the adhesive must be heated to lock-in the micropore formation. The adhesive in the present invention was reformulated by adding surfactants and water to the copolymer to control bubble size, bubble density, viscosity, and stability of the copolymer. The peel value of the adhesive is reduced by the introduction of voids (air bubbles) and the addition of surfactant such as long chain alcohols create a stable inverse emulsion. The peel value of the presently formulated adhesive during testing using dynamic peel data from stainless steel (Peel Adhesion ASTM D-3330) was about 25 oz. in at 1 minute; 27.5 oz. in at 10 minutes and 36.5 oz. in at 24 hours.

Figure 4:
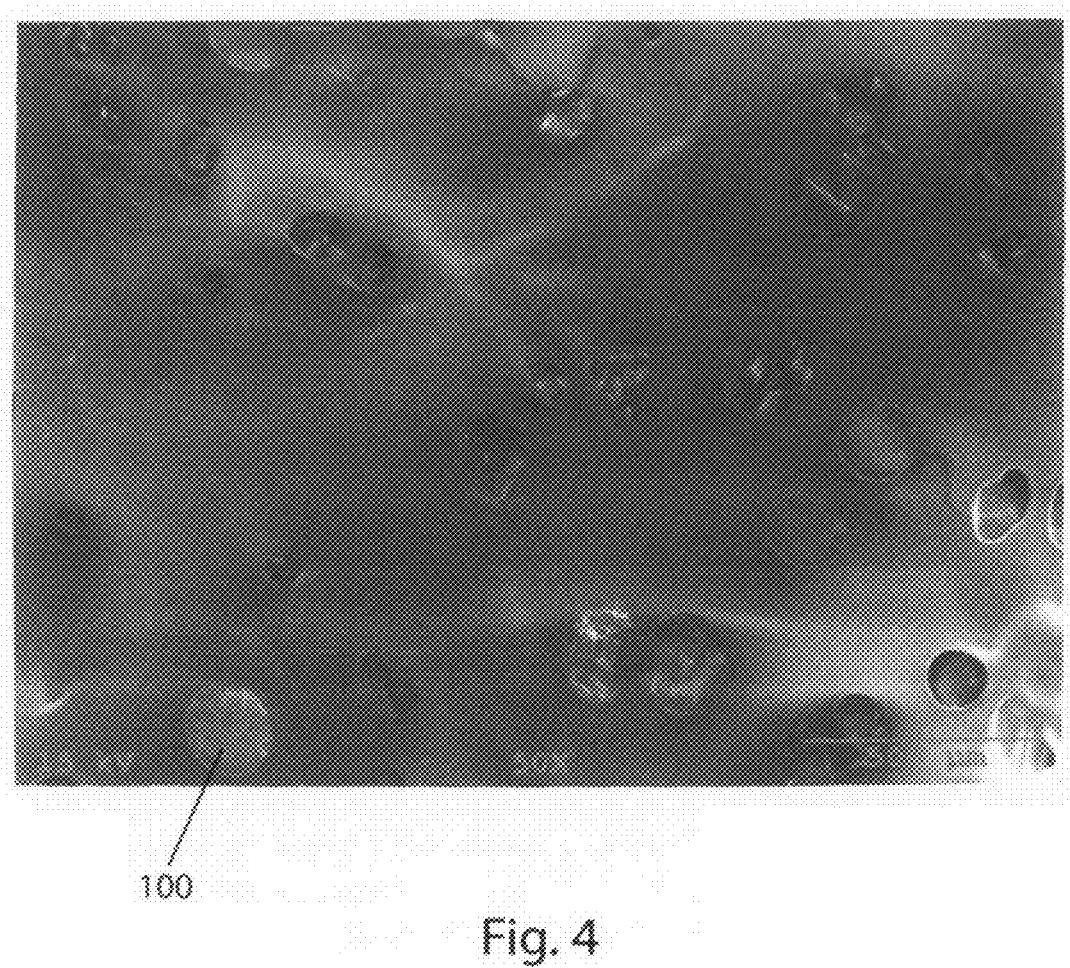
FIG. 4 is a scanning electron microscopy photograph of the porous adhesive used with the construction membrane at 200× magnification.

Microscopy of the modified adhesive surface was performed revealing a porous structure of the inventive adhesive having a bubble density (number of pores) ranging from about 4000 pores in 1.0 $in^2$ to about 4600 pores in 1.0 $in^2$, preferably about 4400 pores in 1.0 $in^2$ with a majority of the pores, preferably about 80% to about 90% of the bubbles/pores having a size ranging from about 200 microns to about 300 microns. See FIGS. 3 and 4. The pores formed are generally round and oval in shape and form a vapor pathway through the adhesive layer. The majority of the pores 100 formed by the bubbles appear to be distributed evenly across the surface penetrating through the adhesive layer when the polymer mixture is heat treated to set the pores in the adhesive. The pore distribution is shown in FIG. 4. Preferably, the density of the foamed adhesive should fall between about 0.65 and about 0.75 after aeration.

The reformatted PSA was manufactured as follows:

The adhesive copolymer as shown in Table I ranged from about 45% by weight to about 50% by weight, preferably about 48% to about 49% by weight. The copolymer was mixed with a first solvent-free, surfactant-based wetting agent, sold under the tradename SURFONYL® PSA-336 (Ethoxylated Acetylenic Diols—more specifically, Docusate sodium, >=30% to <50%, and Ethoxylated 2, 4, 7, 9-tetramethyl 5 decyn-4, 7 diol, >=30% to <50%), preferably ranging from about 4% by weight to about 6% by weight, and most preferably about 5% by weight to provide emulsification and bubble size; and a second surfactant such as a foaming agent, sold under the tradename MICROFOAM® CTFM-A (a proprietary blend of methyl and butyl alcohols from Stepan Company located at 22 West Frontage Road, Northfield, Ill. 60093), ranging from about 1.5% by weight to about 2.0% by weight, and preferably about 1.7% by weight to provide foam formation. A polymeric based water thickener, sold under the tradename SUPERCOL® U (Guar Gum—more specifically, $C_{10}H_{14}N_5NA_2O_{12}P_3$), was added to the mixture in a range from about 0.2% by weight to about 0.4% by weight, preferably about 0.30% by weight. The composition was added to water ranging from about 40% by weight to about 50% by weight, preferably about 43% by weight to about 45% by weight and mixed in a highspeed dispersion mixer at 500 rpm to form uniform bubbles in the mixture and fed into a coater feeder as previously described. The foamed adhesive was coated onto a porous polypropylene liner sheet and heat cured to form an adhesive laminate with pores in place. The adhesive coated porous liner was then secured to a laminate constructed of spun polypropylene. The resultant foamed adhesive had average MVTR (g/m² day) of about 500 with a Peel adh @180° (measured stability) ranging from about 65 to 15, preferably about 40.

The pressure sensitive porous adhesive construction membrane is preferably made by adding a coating of adhesive to the bottom or liner sheet with the composition of the adhesive noted above. The porous adhesive is manufactured in the following steps:

A copolymer with a backbone of n-butyl acrylate (about 60% by weight), 2-ethylhexyl acrylate (about 32% by weight) and vinyl acetate (about 7% by weight) is added to a container;

Water is added in an amount ranging from about 40% by weight to about 50% by weight to the copolymer and mixed to lower viscosity;

A first surfactant ranging from about 4% to about 5% by weight is added to the copolymer/water mixture to provide emulsification;

A second surfactant ranging from about 0.15% to about 0.4% by weight is added to the mixture and mixed for about 20 minutes to provide thickening;

The final adhesive mixture is moved to a high speed dispersion mixer to aerate the adhesive mixture, mixed for about 10 to about 15 minutes at about 5000 rpm to provide emulsification forming the bubbles throughout the adhesive and poured into a coater feeder;

The aerated adhesive is coated onto a release liner using a blade coater which coats the liner between 3 and 5 mils thickness with the preferred thickness being about 4.0 mils;

The adhesive coated liner is dried and heat cured at temperatures ranging from about 165° F. to about 265° F. for a sufficient time to form a laminate and cure or set the bubbles (pores) in place; and Spun polypropylene laminate is then secured to a porous adhesive liner.

In a modified version, a flame retardant material Antimony Oxide was added to the adhesive mixture at about 2% by weight to about 3% by weight. Other flame retardant materials suitable for use with the adhesive may include halogenated fire suppressants, hydrated inorganic compounds such as aluminum trihydrate, magnesium hydroxide, calcium borate and zinc borate, intumescent phosphate, ammonium polyphosphate, organic and inorganic phosphate compounds such as ammonium sulfate, sulfamate compounds and free radical scavenger materials such as antimony trioxide.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An air permeable and vapor permeable building membrane comprising:
    a plurality of permeable plastic sheets secured together;
    a coating of permeable pressure sensitive adhesive coated to an outer surface of one sheet of said membrane, said pressure sensitive adhesive comprising:
        a copolymer with a backbone of n-butyl acrylate, 2-ethylhexyl acrylate, and vinyl acetate, in an amount between 45% and 50%, inclusive, of the total weight of the pressure sensitive adhesive uncured,
        a first surfactant, that includes an ethoxylated acetylenic diol that includes 30% to less than 50% docusate sodium, and 30% to less than 50% ethoxylated 2, 4, 7, 9-tetramethyl 5 decyn-4, 7 diol, in an amount between 4% and 6%, inclusive, of the total weight of the pressure sensitive adhesive uncured, and that promotes emulsification and foaming when the pressure sensitive adhesive is mixed to foam the pressure sensitive adhesive,
        a second surfactant in an amount between 1.5% and 2%, inclusive, of the total weight of the pressure sensitive adhesive uncured, that promotes foaming when the pressure sensitive adhesive is mixed to foam the pressure sensitive adhesive,
        a thickener, that includes $C_{10}H_{14}N_5NA_2O_{12}P_3$, in an amount between 0.2% and 0.4%, inclusive, of the total weight of the pressure sensitive adhesive uncured, and that increases the viscosity of the pressure sensitive adhesive when the adhesive is mixed to foam the pressure sensitive adhesive, and
        water in an amount between 40% and 50%, inclusive, of the total weight of the pressure sensitive adhesive uncured,
    wherein after the pressure sensitive adhesive is mixed and cured, the pressure sensitive adhesive includes interconnected pores that provide a path through the pressure sensitive adhesive through which water vapor may flow at a transmission rate ranging from about 20 Perms to about 70 Perms.

2. An air permeable and vapor permeable building membrane as claimed in claim 1 wherein the pressure sensitive porous adhesive has a vapor permeability ranging from 40 to 50 Perms.

3. An air permeable and vapor permeable building membrane as claimed in claim 1 wherein said pressure sensitive adhesive has a pore density which ranges from about 4000 pores per $in^2$ to about 4600 pores per $in^2$ with about 80% to about 90% of said pores having a pore size ranging from about 200 microns to about 300 microns.

4. An air permeable and vapor permeable building membrane as claimed in claim 1 wherein said adhesive pore configuration is primarily round and oval.

5. An air permeable and vapor permeable building membrane as claimed in claim 1 wherein said pressure sensitive adhesive contains a flame-retardant material.

6. An air permeable and vapor permeable building membrane as claimed in claim 5 wherein said flame retardant material is Antimony Oxide.

7. An air permeable and vapor permeable building membrane as claimed in claim 5 wherein said flame retardant material is present in said pressure sensitive adhesive in a range of about 0.5% to about 3% of the total weight of said pressure sensitive adhesive uncured.

8. An air permeable and vapor permeable building membrane as claimed in claim 1 wherein said cured pressure sensitive adhesive has a pore density of about 4400 $inch^2$.

9. An air permeable and vapor permeable building membrane as claimed in claim 1 wherein said permeable pressure sensitive adhesive has a backbone structure of n-butyl acrylate, 2-ethylhexyl acrylate, and vinyl acetate as shown by the following formula:

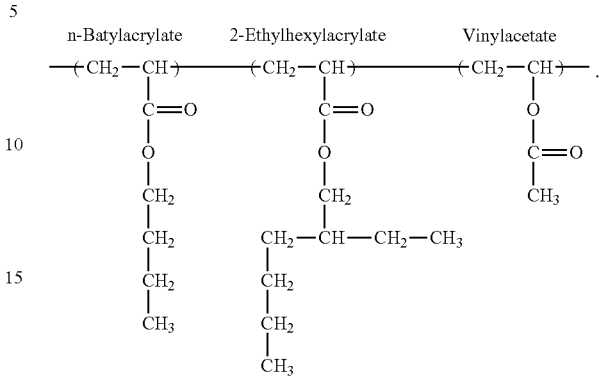

10. The air permeable and vapor permeable building membrane of claim 1 wherein the plurality of permeable plastic sheets includes permeable spun bonded polypropylene sheets.

11. The air permeable and vapor permeable building membrane of claim 1 wherein the plurality of permeable plastic sheets are secured together to form a laminate.

* * * * *